Oct. 13, 1942.  J. OSWIN  2,298,898
GAUGE FOR MEASURING OR CHECKING DIMENSIONS
Filed Jan. 16, 1940
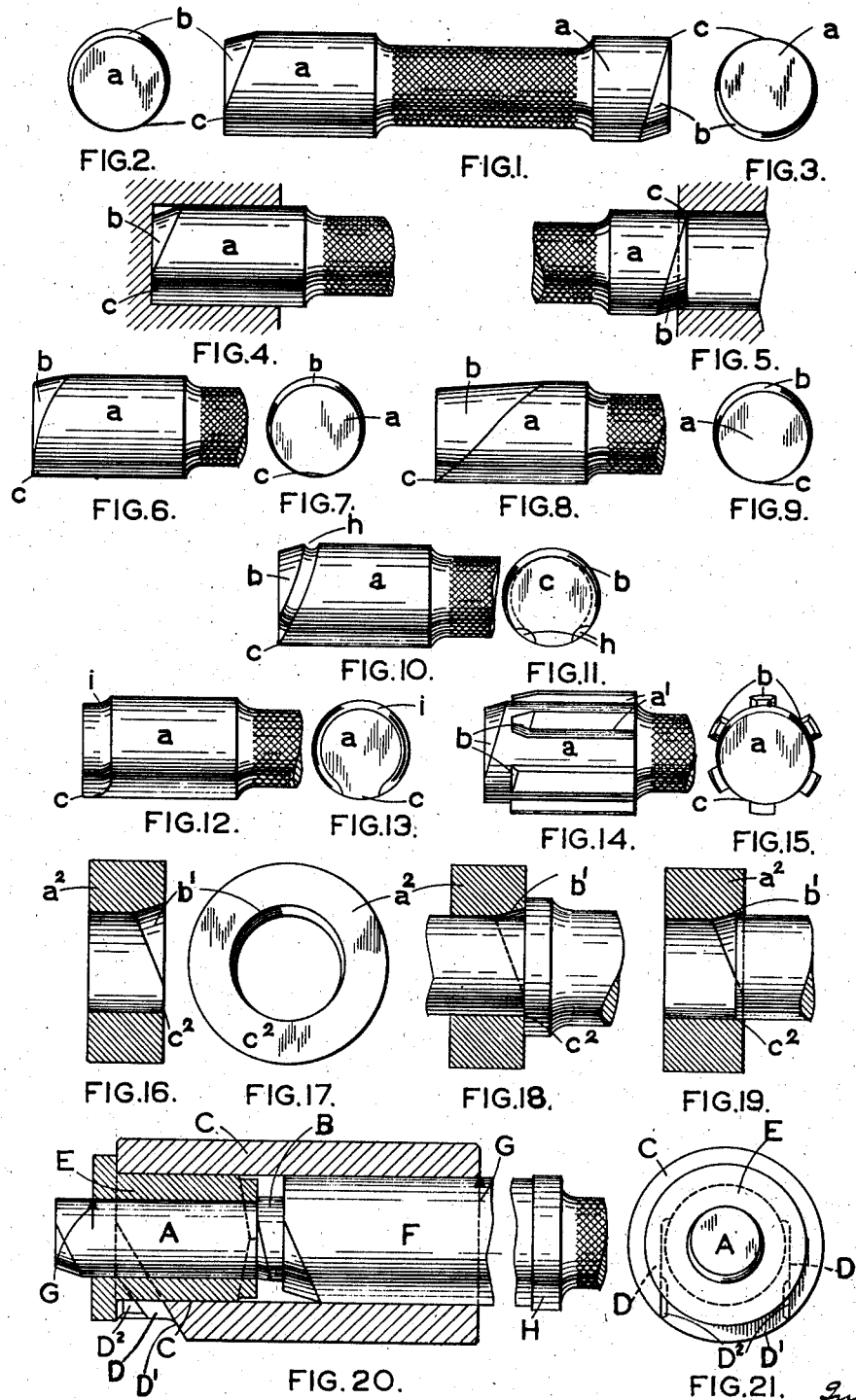

Patented Oct. 13, 1942

2,298,898

UNITED STATES PATENT OFFICE 2,298,898

GAUGE FOR MEASURING OR CHECKING DIMENSIONS

John Oswin, Coventry, England, assignor of one-half to John Ernest Neale, Coventry, England Application January 16, 1940, Serial No. 314,169 In Great Britain January 16, 1939

7 Claims. (Cl. 33—178)

This invention relates to gauges for measuring or checking the accuracy of internal and external dimensions.

It is known that in gauging to fine limits considerable difficulty is often experienced in introducing the gauge into or onto the work, and that the difficulty increases with the diameter. The difficulty is due to the necessity for presenting the gauge to the work, or vice versa with their axes in true alignment with each other and, if the deviation from true axial alignment exceeds that permitted by the limit, the gauge will either not enter or engage the work, or will jam and possibly injure the work or the gauge. For the same limit the degree of permissible deviation decreases with the diameter of the gauge.

I am aware that in order to facilitate the engagement of a plug gauge with the hole to be gauged it has already been proposed to cone or chamfer the entering end of the gauge, the coning or chamfering extending around the full extent of the circumference. For the same purpose it has also been proposed in gauges of the kind referred to, to back off the end of the gauge to form a pilot having a diameter equal to that of the gauge itself.

The object of the present invention is to facilitate engagement between the gauge and the work and at the same time to enable a hole closed at one end to be gauged right up to the closed end, and a cylindrical article to be gauged right up to a shoulder.

According to the present invention measuring gauges for the purposes herein referred to are characterized in that the arc or arcs of the effective surface of the gauge for each unit of axial length increases progressively from a minimum at one or more places beginning at the extreme leading or receiving end and continuing to a maximum where the ends of the arc or arcs meet in a complete or continuous circle at a place further from the said end of the gauge where the arcuate leading or pilot portion merges with the cylindrical portion, the non-effective part of the gauge between such places of minimum and maximum effective surface being cut away so as to facilitate engagement between the gauge and the work-piece.

The said end of the gauge may be partially relieved or reduced either uniformly or progressively in a radial and/or axial direction, for example, the entering or leading end of a male gauge, or the receiving end of the hole or opening in a female gauge, may be coned, chamfered or reduced at an angle to the axis of the gauge.

The effect of relieving or reducing the end of the gauge may be such that the said end is eccentric to and flush at one side with the remaining or effective portion of the gauge, or such that the end of the gauge or gauge opening is of non-circular form with one or more peripheral portions thereof flush with the effective portion of the gauge.

In the accompanying drawing,

Figure 1 shows one application of the present invention to a "go" and "not go" plug gauge.

Figures 2 and 3 are end views thereof.

Figure 4 illustrates the use of the improved gauge for blind holes.

Figure 5 shows the "not go" end of the improved plug gauge applied to a hole.

Figures 6 and 7 to 13 show in side and end views respectively various alternative forms of plug gauge embodying the invention.

Figures 14 and 15 are side and end views respectively of a spline gauge embodying one form of the invention.

Figures 16 and 17 are axial section and end views respectively of a ring gauge embodying one form of the invention.

Figure 18 illustrates the use of the gauge shown in Figure 16 on shouldered work.

Figure 19 illustrates the use of a "not go" ring gauge of the kind shown in Figure 16.

Figure 20 is a longitudinal sectional view illustrating the use of a combined "go" and "not go" plug gauge in combination with a combined "go" and "not go" female gauge.

Figure 21 is an end view thereof.

The invention is shown in what perhaps is its simplest form in Figures 1, 2 and 3 as applied to the "go" and "not go" ends of a plug gauge. In this form each end $a$ of the gauge is coned or chamfered as at $b$ at an angle to the axis of the gauge and in such a manner as to leave a portion $c$ of the circumference of the end of the gauge of full diameter and being an arc subtending an angle of less than 180°, the remaining portion being progressively reduced in diameter to a maximum reduction diametrically opposite the portion of full diameter. At the same time the axial extent of the conical or chamfered portion progressively diminishes at each side from a maximum at the portion of minimum diameter to zero at the ends of the portion of maximum diameter. It is not necessary for each end of the gauge to be coned to the same extent, for example, the "not go" end may be coned at a more acute angle to the axis of the gauge and to a less extent axially than the "go" end.

Apart from the facility with which a "go" gauge embodying this invention can, irrespective of limit and diameter, be introduced into or onto the work to be gauged it has the important advantage that in the case of a male gauge it can be used for gauging the full depth of a blind or shouldered hole. This is illustrated in Figure 4. In a similar way, as will be hereinafter described, a female gauge made according to the invention can be used for gauging work up to a shoulder.

Where the invention is applied to a "not go" gauge it has the advantage that the gauge can be partially engaged with the work thereby preventing damage to the edge of the work and of the gauge whilst at the same time giving the operator some idea of the extent to which the work is oversize or undersize, as the case may be.

Recognizing that the invention is capable of embodiment in a great variety of modified forms, I make no attempt herein to illustrate or describe all such possible modifications, but simply content myself with the illustration and description, merely by way of example, of a few modified embodiments in plug gauges in addition to the preferred form of the invention as embodied in a plug form of gauge as illustrated in Figures 1 to 5 inclusive and as embodied in a ring form or female gauge as illustrated in Figures 16 to 19 inclusive, it being understood that such modifications, while being illustrated in plug gauges may also be embodied in ring gauges.

The coned or chamfered portion $b$ of the gauge may either be part of a true cone as shown in Figure 1 or of part of a conoidal figure, as represented in Figures 6 and 7, where it will be seen that in side elevation the coned or chamfered portion has a convex surface.

The axial extent of the coned or chamfered portion of the gauge may vary within wide limits as, for example, is shown by Figures 8 and 9 in comparison to Figures 1 and 2.

In order to provide against the possibility of loose metal piling up on the gauge when gauging holes in soft metal the modified embodiment illustrated in Figures 10 and 11 is formed with a groove $h$ between the coned or chamfered portion $b$ and the rest of the gauge to receive the loose metal. This groove may be formed at an angle to the axis of the gauge and extend only around a portion of the circumference leaving a portion $c$ of the end of the gauge of full diameter.

In the modified embodiment illustrated in Figures 12 and 13 the leading end of the gauge is uniformly reduced in diameter around a portion $i$ of the circumference, leaving a portion $c$ at one side of full diameter and axial length.

The invention is not confined in its application to plain gauges but may also be applied to screw and other types of gauges. For example, as illustrated by the embodiment shown in Figures 14 and 15 it may be usefully applied to a male spline gauge, the end of the core and of the splines being coned or chamfered as at $b$ at an angle to the gauges leaving a portion $c$ of the core $a$ and one or more splines $a^1$ of full diameter and axial length.

As already stated the invention is equally applicable to female gauges. In the case of a ring gauge, for example, the receiving end of the gauge $a^2$ may, as shown in Figures 16 and 17, be coned or chamfered at $b^1$ at an angle to the axis of the gauge so as to leave a portion $c^2$ of the end of the hole of full diameter and axial length. The use of a gauge of this kind for gauging work up to a shoulder is shown in Figure 18 and as applied to a "not go" gauge in Figure 19.

All of the modifications above described with reference to plug or male gauges are also applicable to ring or female gauges including female spline gauges.

The invention also comprehends, as shown in the embodiment illustrated in Figures 20 and 21, the combination of a multi-diameter plug gauge with a ring or female gauge to gauge the external and internal walls, of diameters of the external and internal walls, and the concentricity thereof, of such parts as a bushing E.

Preferably the ring or female gauge C of said combination is constructed as a "go" and "not go" gauge and is characterized by the fact that the "not go" portion does not interfere with the free use of the "go" portion in gauging work the axial length of which exceeds that of the gauge. So far as the "go" portion is concerned the gauge C may be of conventional ring type. The "not go" part of the ring or female gauge C of the said combination may be formed by making a gap D in the face of one end thereof so that the female gauge C functions in effect as both a ring gauge and a gap gauge. The base $D^1$ of the gap D is formed at an angle to the axis of the gauge C, as seen in Figure 20, thus giving a lead, so far as the gauging of bushings such as E is concerned, to the go portion $C^1$ of the female gauge C. The gap D may extend across merely a part of the end face of the female gauge member C and preferably will extend appreciably in excess of more than half way across the same and will have axially extending preferably parallel side walls formed with "not go" anvils $D^2$ adjacent the outer peripheral face of said female gauge C, which anvils terminate at a point far short of the greatest diameter of the inner cylindrical gauging or "go" surface $C^1$, as shown in Figures 20 and 21.

In using said combination, the external diameter of the bush E is first checked by the "not go" gap D in the ring gauge C and if within the prescribed limits is then inserted in the "go" portion $C^1$ thereof. The internal diameter and concentricity of the bush is then checked by means of the combined "go" and "not go" plug gauge which, as illustrated in Figures 20 and 21 is inserted from the other end of the ring gauge and may have three diameters the leading end of each of which may be formed in any of the ways hereinbefore described.

The smaller end A of the plug gauge constitutes the "go" portion for the internal diameter of the bush. The intermediate portion B forms the "not go" portion for the same nominal diameter, whilst the larger end F of the plug is a push fit in the "go" bore of the ring gauge. Each end of the plug gauge may carry a mark G for checking the axial length of the bush and for indicating whether or not the bore of the bush is sufficiently oversize to permit the "not go" portion B of the plug gauge to enter the bush. The plug gauge also functions as an ejector for removing the bush from the ring gauge and may be provided with a stop H at the large end.

Alternatively, the plug gauge may be of two diameters only viz: a "go" and "not go" for the bore of the bush. In this case the ring gauge will also be of two diameters viz: a "go" portion at one end for the external diameter of the bush and a portion at the other end for the "not go" part of the plug gauge.

I claim:

1. A female gauge comprising, a cylindrically bored gauge body formed at one end of its bore with a gap opening into said bore and having spaced axially parallel sides and an axially diagonal bottom, said bottom intersecting said bore around a portion of its circumference so that the internal cylindrical surface of said bore increases in area in an axial direction away from its intersection with said diagonal bottom.

2. A gauge comprising a gauge body formed with a gauging portion having a complete cylindrical gauging surface commencing rearwardly from the leading end of said body, the extreme leading end being smaller in cross section than said gauging portion and formed with an arcuate supporting and guiding surface subtending an angle of less than 180 degrees at its extreme leading end and constituting a forward continuation of the adjacent cylindrical surface of said gauge body, and in operation serving to provide lateral support and guidance for the gauge body as the same is disposed in gauging position with the work piece.

3. An element to cooperate in making a snug male and female fit with a cooperating part by relative movement in the direction of the axis of said element, said element being formed with a complete cylindrical surface commencing rearwardly from its leading end to make an extremely close fit with relation to the correspondingly formed opposed face of the cooperating part, the extreme leading end of said element being of non-circular cross-section and formed with an arcuate supporting and guiding surface subtending an angle of less than 180 degrees at its extreme leading end and constituting a forward continuation of the adjacent cylindrical surface of said element.

4. An element to cooperate in making a snug male and female fit with a cooperating part by relative movement in the direction of the axis of said element, said element being formed with a complete cylindrical surface portion commencing rearwardly of its leading end to make an extreme close fit with relation to the correspondingly formed opposed face of the cooperating part, and said element being further formed with an arcuate portion extending flush with and as a continuation of said cylindrical surface portion to the extreme leading end of said element, said arcuate portion at its extreme leading end subtending an angle of less than 180 degrees and regularly increasing in extent from its extreme leading end toward said cylindrical surface portion so as to subtend a progressively increasing angle until the two ends of the arc meet in a complete circle at the point of mergence of said arcuate portion with said cylindrical surface portion.

5. An element to cooperate in making a snug male and female fit with a cooperating part by relative movement in the direction of the axis of said element, said element being formed with a cylindrical surface portion, a reduced portion, a groove, and an arcuate portion, said cylindrical surface portion commencing rearwardly of the leading end of said element, said reduced portion extending from the extreme leading end of said element toward said cylindrical surface portion and decreasing in area as it approaches said latter portion, said groove being disposed between said cylindrical surface portion and said reduced portion, and said arcuate portion having a surface flush with and extending without interruption as a continuation of the surface of said cylindrical surface portion from the latter to the extreme leading end of said element and subtending at its extreme leading end an angle of less than 180 degrees and regularly increasing in extent from its extreme leading end toward said cylindrical surface portion so as to subtend a progressively increasing angle until the two ends of the arc of its surface meet in a complete circle at the point of mergence of said arcuate portion with said cylindrical surface portion.

6. A gauge comprising a gauge body formed with a gauge portion having a complete cylindrical surface commencing rearwardly from the leading end of said body, the extreme leading end of said body being smaller in cross-section than said gauging portion and formed with an arcuate supporting and guiding surface flush with and constituting a forward continuation of the adjacent cylindrical surface of said gauging portion, the segment of said arc decreasing from said cylindrical gauging portion toward the leading end of said body, whereby the area of said arc effective to provide lateral support and guidance for the gauge increases as the gauge body progressively enters the work-piece.

7. An element to cooperate in making a snug male and female fit with a cooperating part by relative movement in the direction of the axis of said element, said element being formed with a cylindrical gauging portion commencing rearwardly from its leading end to make an extremely close fit with relation to the opposed cylindrical face of the cooperating part, the extreme leading end of said element being of such size in cross-section with relation to said opposed cylindrical face as to make a loose fit therewith when said element and said part are first associated in axial alignment and interfitting relation, the said extreme leading end of said element being formed with an arcuate supporting and guiding surface flush with and constituting a forward continuation of the cylindrical surface of said gauging portion, said arcuate supporting and guiding surface increasing in size of segment from a minimum at a point in advance of said cylindrical gauging portion to a maximum adjacent the leading end of said cylindrical gauging portion, whereby the arcuate surface serving to support and guide said element by engagement with said cooperating part increases in area as said element is increasingly engaged by said part until finally the cylindrical gauging portion of said element is properly centered with respect to said cooperating part.

JOHN OSWIN.